(12) United States Patent
Mizuno et al.

(10) Patent No.: US 8,775,080 B2
(45) Date of Patent: Jul. 8, 2014

(54) DESTINATION ESTIMATING APPARATUS, NAVIGATION SYSTEM INCLUDING THE DESTINATION ESTIMATING APPARATUS, DESTINATION ESTIMATING METHOD, AND DESTINATION ESTIMATING PROGRAM

(75) Inventors: Nobuhiro Mizuno, Tokyo (JP); Yasuhiro Shimizu, Kariya (JP)

(73) Assignees: Denso It Laboratory, Inc., Tokyo (JP); Denso Corporation, Karitya (JP)

( * ) Notice: Subject to any disclaimer, the term of this patent is extended or adjusted under 35 U.S.C. 154(b) by 171 days.

(21) Appl. No.: 13/430,349

(22) Filed: Mar. 26, 2012

(65) Prior Publication Data
US 2012/0310534 A1 Dec. 6, 2012

(30) Foreign Application Priority Data
Jun. 6, 2011 (JP) .................... 2011-126774

(51) Int. Cl.
G01C 21/26 (2006.01)
G01C 21/34 (2006.01)
(52) U.S. Cl.
USPC ............................ 701/540; 701/521; 701/533
(58) Field of Classification Search
None
See application file for complete search history.

(56) References Cited

U.S. PATENT DOCUMENTS

| 7,512,487 B1* | 3/2009 | Golding et al. ............... 701/424 |
| 8,392,116 B2* | 3/2013 | Lehmann et al. ............. 701/524 |
| 2002/0161517 A1* | 10/2002 | Yano et al. .................... 701/209 |
| 2007/0005235 A1 | 1/2007 | Suzuki et al. |
| 2009/0319176 A1* | 12/2009 | Kudoh et al. ................. 701/207 |
| 2013/0158854 A1* | 6/2013 | Weir et al. .................... 701/400 |

FOREIGN PATENT DOCUMENTS

JP 2007-10572 A 1/2007

* cited by examiner

Primary Examiner — Michael J Zanelli
(74) Attorney, Agent, or Firm — Pearne & Gordon LLP

(57) ABSTRACT

An object of this invention is to improve the accuracy of estimating a destination in a destination estimating apparatus. A destination estimating apparatus 100 includes: a learning data storing unit 9b that stores a history of a location specified as a destination in the past; a destination estimating unit 83 that estimates a destination from among a plurality of destination candidates including a location stored in the learning data storing unit 9b; and a candidate excluding unit 84 that, based on the history stored in the learning data storing unit 9b, excludes a destination candidate for which it is determined that a certainty factor of being a destination is lower than a predetermined threshold value from destination candidates that are estimated as being a destination by the destination estimating unit 83.

21 Claims, 8 Drawing Sheets

DESTINATION ESTIMATING APPARATUS, NAVIGATION SYSTEM INCLUDING THE DESTINATION ESTIMATING APPARATUS, DESTINATION ESTIMATING METHOD, AND DESTINATION ESTIMATING PROGRAM

BACKGROUND OF THE INVENTION

1. Field of the Invention

The present invention relates to a destination estimating apparatus, a navigation system including the destination estimating apparatus, a destination estimating method, and a destination estimating program, and more particularly to a destination estimating apparatus that takes locations that have been specified as a destination in the past as destination candidates and estimates a destination from among the destination candidates, a navigation system including the destination estimating apparatus, a destination estimating method and a destination estimating program.

2. Description of the Related Art

Conventional navigation systems have a function that, when a destination is set, searches for a route from the current position to the destination. A navigation system is also known that includes a function that, when related information exists such as information regarding traffic congestion or traffic restrictions on a route found by a search operation, presents the information to a user or searches for a route in a manner that takes the related information into consideration.

A user can set a destination in a navigation system. However, because of the trouble involved in an operation to set a destination in a navigation system, when a destination is a location that the user is accustomed to travelling to and route guidance is unnecessary, in some cases the user does not set a destination in the navigation system and consequently route searching and route guidance are not performed by the navigation system.

In such a case, the user cannot use functions such as the aforementioned function that presents related information to the user and function that searches for a route in consideration of the related information that are executed by the navigation system, and therefore the user may travel on the route without knowing that traffic congestion has arisen, or may travel as far as a point at which traffic restrictions are in place before first learning that the traffic restrictions exist on the route and consequently may have to take a detour.

A navigation system has been proposed that includes a destination estimating apparatus that, even when a user does not set a destination, automatically estimates a destination based on situation information such as the time period, the day of the week, the existence or non-existence of a passenger, and on user information such as the age and occupation of the user (for example, see Japanese Patent Laid-Open No. 2007-10572). According to the aforementioned destination estimating apparatus, locations that have been specified as destinations in the past are taken as destination candidates, and a location that has the highest likelihood based on the aforementioned situation information and user information is selected and estimated to be the destination.

According to this such of destination estimating apparatus, even in a case in which the route is a road that the user is accustomed to and the user does not set a destination in the navigation system because the user believes route guidance is not required, it is possible for the destination estimating apparatus to automatically estimate the destination, search for a route thereto, and if there is related information regarding the route found by the search, present the related information to the user or present a route that takes the related information into consideration.

SUMMARY OF THE INVENTION

According to the conventional destination estimating apparatus, as described above, locations that were specified as a destination in the past are taken as destination candidates, and the destination is estimated from among those destination candidates.

FIG. 8 is a graph that illustrates an example of a number of arrivals with respect to respective destinations in a history of past destinations. As shown in FIG. 8, in the history of past destinations, in actual fact, for example, 90 percent or more of the destinations are locations to which the user went to only one time, and the number of arrivals with respect to approximately 10 percent of the entire number of destinations accounts for 90 percent or more of the overall number of arrivals.

Accordingly, for example, there are cases in which a location which the user travelled to only once quite some time in the past and which it can be considered at the present time that the user will not travel to a second time is estimated as being a destination based on situation information or user information. There is thus the problem that the accuracy of estimating a destination declines.

The present invention has been conceived to solve the problem of the conventional technology, and an object of the present invention is to improve the accuracy of estimating a destination in a destination estimating apparatus that takes locations specified as a destination in the past as destination candidates and estimates a destination from among those destination candidates, or in a navigation system that includes the destination estimating apparatus.

A destination estimating apparatus according to the present invention includes: a history storing unit that stores a history of a location that has specified as a destination in the past; a destination estimating unit that estimates a destination from among a plurality of destination candidates including a location stored in the history storing unit; a candidate excluding unit that, based on the history that is stored in the history storing unit, excludes a destination candidate for which a certainty factor of being a destination is determined to be lower than a predetermined threshold value from destination candidates to be estimated as being a destination by the destination estimating unit; an observed variable acquiring unit that acquires an observed variable; and a model storing unit that stores a probability model for determining a probability of the plurality of destination candidates with respect to the observed variable; wherein: based on the probability model that is stored in the model storing unit, the destination estimating unit determines a probability of the plurality of destination candidates with respect to the observed variable that is acquired by the observed variable acquiring unit and estimates a destination candidate having a high probability to be the destination; and, based on the history that is stored in the history storing unit, the candidate excluding unit excludes a destination candidate for which the certainty factor is determined to be lower than a predetermined threshold value from the destination candidates for which a probability is determined by the destination estimating unit.

According to this configuration, since a location for which it is determined that a certainty factor of being a destination is lower than a predetermined threshold value is not included in destinations estimated by the destination estimating unit, when destination candidates are arranged in the order of highest probability of being a destination based on a probability model, in comparison to a case in which a destination candidate exists for which a certainty factor of being a destination is low, the ranking of a destination candidate for which a certainty factor of being a destination is high changes (moves upward). As a result, the accuracy of estimating a destination improves. Further, even in the case of destination candidates which are determined to have a high probability (likelihood) of being a destination based on a probability model, a destination candidate for which a certainty factor of being a destination is low is excluded, and a destination candidate having a high probability among the remaining destination candidates is estimated to be the destination. That is, after determining the probability of destination candidates using a probability model in a similar manner to the conventional technology, the destination estimating apparatus excludes candidates with a low certainty factor from among the destination candidates, and estimates a destination candidate that has the highest probability to be the destination. In this connection, the destination estimating unit may also estimate a plurality of destination candidates to be destinations. In this case, a configuration may be adopted such that the user is caused to select a destination from among the estimated destinations, or a configuration may be adopted that performs route searching for all of the estimated destinations and presents related information that relates to routes found by the search. Further, the above described certainty factor is a variable that is obtained based on a history stored in the history storing unit and, for example, may be a variable that increases with respect to a destination candidate that the user goes to on a routine basis and with respect to a destination candidate that there is a possibility that the user will go to on a routine basis from the present time onwards.

A destination estimating apparatus according to another aspect of the present invention includes: a history storing unit that stores a history of a location that has been specified as a destination in the past; a destination estimating unit that estimates a destination from among a plurality of destination candidates including a location stored in the history storing unit; an observed variable acquiring unit that acquires an observed variable; a model storing unit that stores a probability model for determining a probability of the plurality of destination candidates with respect to the observed variable; a learning unit that, taking the location that has been specified as a destination in the history as the destination candidate, learns the probability model that is stored in the model storing unit; and a candidate excluding unit that, based on the history that is stored in the history storing unit, excludes a destination candidate for which a certainty factor of being a destination is determined to be lower than a predetermined threshold value from the destination candidates that are used for learning by the learning unitwherein, based on the probability model that is stored in the model storing unit, the destination estimating unit determines a probability of the plurality of destination candidates with respect to the observed variable that is acquired by the observed variable acquiring unit, and estimates a destination candidate having a high probability to be the destination.

According to this configuration also, since a location for which it is determined that a certainty factor of being a destination is lower than a predetermined threshold value is not included in destinations estimated by the destination estimating unit, when destination candidates are arranged in the order of highest probability of being a destination based on a probability model, in comparison to a case in which learning is performed that includes a destination candidate for which a certainty factor of being a destination is low, the ranking of a destination candidate for which a certainty factor of being a destination is high changes (moves upward). As a result, the accuracy of estimating a destination improves. Further, although the destination estimating unit estimates a destination based on a probability model that is learned based on a history, at the time of learning, a destination candidate with a low certainty factor is excluded. Hence, if destinations are estimated similarly to the conventional technology based on a probability model that is learned in this manner, destination candidates with a low certainty factor will no longer be estimated as being a destination.

In the above described destination estimating apparatus, date information may be included in the history of a location that has been specified as a destination in the past that is stored in the history storing unit, and the candidate excluding unit may exclude a destination candidate for which, based on the date information, it is determined that a certainty factor of being a destination is lower than a predetermined threshold value.

According to this configuration, a destination candidate for which, using date information in the history, it is determined that a certainty factor of being a destination is lower than a predetermined threshold value can be suitably excluded. When date information is included in the history, it is possible for the candidate excluding unit to, for example, arrange the history in date order and refer to only the history of a fixed number of most recent actions, or to ascertain a number of actions or a time period up to the present time since a day that a certain location whose history is arranged in date order was last specified as a destination. In this connection, time of day information may also be included in the history in addition to date information.

In the above described destination estimating apparatus, the certainty factor is determined based on: (a) a proportion of times that the relevant destination candidate has been specified as a destination with respect to a fixed number of most recent actions; (b) a number of actions since a day that the relevant destination candidate has been last specified as a destination; (a') a proportion of times that the relevant destination candidate has been specified as a destination with respect to actions in a most recent fixed period of time; (b') a time period since a day that the relevant destination candidate has been last specified as a destination; (a) and (b); (a') and (b); (a) and (b'); or (a') and (b').

According to this configuration, a certainty factor can be made a variable that increases for a destination that the user goes to on a routine basis and for a destination for which there is a possibility that the user will go to on a routine basis from now on, and a destination candidate that the user does not go to on a routine basis can be suitably excluded.

In the above described destination estimating apparatus, the certainty factor may be determined based on a proportion of times that the relevant destination candidate has been specified as a destination or on a number of times that the relevant destination candidate has been specified as a destination with respect to all histories stored in the history storing unit.

According to this configuration, for example, a destination candidate for which a proportion of times that the destination candidate has been specified as a destination with respect to all histories is less than a predetermined threshold value or a destination candidate for which a number of times that the destination candidate has been specified as a destination with respect to all histories is less than a predetermined threshold value is excluded by the candidate excluding unit.

In the above described destination estimating apparatus, a weight may be assigned to a history of a location specified as a destination in the past that is stored in the history storing unit, and the weight may be taken into consideration when determining the certainty factor.

According to this configuration, when a certain location is specified as a destination, a history to which a weight is assigned in accordance with various conditions is stored, and the weight is taken into consideration when determining a certainty factor. Hence a destination candidate that has a low possibility of being specified as a destination by the user can be excluded with greater accuracy.

In the above described destination estimating apparatus, the weight may be assigned in accordance with whether or not the relevant location has been specified as a destination as a result of a user setting the relevant location as a destination.

It can be considered that there is a relatively high possibility that a location the user has set as a destination is a location to which the user is unaccustomed to going to. In contrast, it can be considered that if a location was reached without the user setting the location as a destination, there is a relatively high possibility that the user is accustomed to going to that location. Therefore, according to the above configuration, such kind of location is excluded from destination candidates that are estimated as being a destination, and thus a destination candidate that has a low possibility of being specified as a destination by the user can be excluded with greater accuracy.

In the above described destination estimating apparatus, the weight may be assigned in accordance with a distance from a place of departure to the relevant location.

It can be considered that when a distance from a place of departure to a location that was specified as a destination is long, there is a relatively high possibility that the user went to the location for a definite purpose. Conversely, it can be considered that when a distance from a place of departure to a location that was specified as a destination is short, there is a relatively high possibility that the relevant location was specified as a destination for reasons such as the user happening to stop there. Therefore, according to this configuration, a destination candidate that has a low possibility of being specified as a destination by the user can be excluded with greater accuracy.

In the above described destination estimating apparatus, the weight may be assigned in accordance with whether or not the relevant location is a location at which many people gather.

For example, when a location is one where in general many people gather, such as a location where there are a large number of parking spaces, it is considered that there is a relatively high possibility of that location being specified as a destination again. Hence, according to this configuration, a destination candidate that has a low possibility of being specified as a destination by the user can be excluded with greater accuracy.

According to a further aspect of the present invention, there is provided a navigation system that includes the above described destination estimating apparatus, and a route searching unit that searches for a route to a destination that is estimated by the destination estimating unit.

According to this configuration also, since a location for which a certainty factor of being a destination is determined to be lower than a predetermined threshold value is no longer included among destinations estimated by the destination estimating unit, the accuracy of estimating a destination increases.

The above described navigation system may further include a related information presenting unit that presents related information that relates to a route that is found by a search operation of the route searching unit.

In the case of a destination that the user goes to on a routine basis, because the user knows the route well, in some cases the user will not go to the trouble of setting the destination in the navigation system to perform a route search. However, according to the above configuration, even when a user has not set a destination, if related information exists regarding a route to that destination, the related information can be presented to the user.

Further, in the above described navigation system, the route searching unit may search for a route based on related information that includes traffic congestion information and traffic restrictions information.

According to this configuration, even when a user has not set a destination, the route searching unit searches for a route based on related information that includes traffic congestion information and traffic restrictions information. Therefore, if related information such as congestion information or traffic restrictions information exists regarding a route that the user travels on a routine basis, the route searching unit can search for another route in a manner that takes the related information into consideration.

According to a further aspect of the present invention, there is provided a destination estimating method that includes: a history storing step of storing a history of a location that has been specified as a destination in the past; a destination estimating step of estimating a destination from among a plurality of destination candidates including a location stored in the history storing step; a candidate excluding step of, based on the history that is stored in the history storing step, excluding a destination candidate for which a certainty factor of being a destination is determined to be lower than a predetermined threshold value from destination candidates to be estimated as being a destination in the destination estimating step; an observed variable acquiring step of acquiring an observed variable; and a probability acquiring step of, based on a probability model for determining a probability of the plurality of destination candidates with respect to the observed variable, determining a probability of the plurality of destination candidates with respect to the observed variable that is acquired in the observed variable acquiring step; wherein: the candidate excluding step excludes a destination candidate for which it is determined that the certainty factor is lower than a predetermined threshold value from the destination candidates for which a probability is determined in the probability acquiring step; and the destination estimating step estimates a destination candidate for which a probability that is determined in the probability acquiring step is high among the destination candidates that remain after the destination candidate is excluded in the candidate excluding step to be the destination.

According to this configuration, since a location for which it is determined that a certainty factor of being a destination is lower than a predetermined threshold value is not included in destinations estimated by the destination estimating step, the accuracy of estimating a destination improves. Further, according to this configuration, even in the case of destination candidates which are determined to have a high probability (likelihood) of being a destination based on a probability model, a destination candidate for which a certainty factor of being a destination is low is excluded, and a destination candidate having a high probability among the remaining destination candidates is estimated to be a destination. That is, after determining the probability of destination candidates using a probability model in a similar manner to the conventional technology, the destination estimating method excludes a candidate with a low certainty factor from among the destination candidates, and estimates a destination candidate having a high probability to be a destination.

A destination estimating method according to a further aspect of the present invention includes: a history storing step of storing a history of a location that has been specified as a destination in the past; a destination estimating step of estimating a destination from among a plurality of destination candidates including a location stored in the history storing step; a candidate excluding step of, based on the history that is stored in the history storing step, excluding a destination candidate for which a certainty factor of being a destination is determined to be lower than a predetermined threshold value from destination candidates to be estimated as being a destination in the destination estimating step; an observed variable acquiring step of acquiring an observed variable; and a learning step of, taking the destination in the history as the destination candidate, learning a probability model for determining a probability of the plurality of destination candidates with respect to the observed variable; wherein: the candidate excluding step excludes a destination candidate for which, based on the history that is stored in the history storing step, it is determined that a certainty factor of being a destination is lower than a predetermined threshold value from the destination candidates that are used for learning in the learning step; and based on the probability model that is learned by the learning step, the destination estimating step determines a probability of the plurality of destination candidates with respect to the observed variable that is acquired in the observed variable acquiring step, and estimates a destination candidate having a high probability to be the destination.

According to this configuration also, since a location for which it is determined that a certainty factor of being a destination is lower than a predetermined threshold value is not included in destinations estimated by the destination estimating step, the accuracy of estimating a destination improves. Further, according to this configuration, learning of a probability model based on a history is performed in the learning step and estimation of a destination based on the learned probability model is performed in the destination estimating step, and in the aforementioned learning step, a destination candidate for which a certainty factor is low is excluded. Hence, if destinations are estimated similarly to the conventional technology based on a probability model that is learned in this manner, destination candidates with a low certainty factor will no longer be estimated as being a destination.

According to a still further aspect of the present invention, there is provided a destination estimating program that causes a computer to execute: a history storing step of storing a history of a location that has been specified as a destination; a destination estimating step of estimating a destination from among a plurality of destination candidates including a location stored in the history storing step; a candidate excluding step of, based on the history that is stored in the history storing step, excluding a destination candidate for which a certainty factor of being a destination is determined to be lower than a predetermined threshold value from destination candidates to be estimated as being a destination in the destination estimating step; an observed variable acquiring step of acquiring an observed variable; and a probability acquiring step of, based on a probability model for determining a probability of the plurality of destination candidates with respect to the observed variable, determining a probability of the plurality of destination candidates with respect to the observed variable that is acquired in the observed variable acquiring step. In this case, the candidate excluding step excludes a destination candidate for which it is determined that the certainty factor is lower than a predetermined threshold value from the destination candidates for which a probability is determined in the probability acquiring step; and the destination estimating step estimates a destination candidate for which a probability that is determined in the probability acquiring step is high among the destination candidates that remain after the destination candidate is excluded in the candidate excluding step to be the destination.

According to this configuration also, since a location for which it is determined that a certainty factor of being a destination is lower than a predetermined threshold value is not included in destinations estimated by the destination estimating step, the accuracy of estimating a destination improves. Further, according to this configuration, even in the case of destination candidates which are determined to have a high probability (likelihood) of being a destination based on a probability model, a destination candidate for which a certainty factor of being a destination is low is excluded, and a destination candidate having a high probability among the remaining destination candidates is estimated to be a destination.

A destination estimating program according to a further aspect of the present invention causes a computer to execute: a history storing step of storing a history of a location that has been specified as a destination; a destination estimating step of estimating a destination from among a plurality of destination candidates including a location stored in the history storing step; a candidate excluding step of, based on the history that is stored in the history storing step, excluding a destination candidate for which a certainty factor of being a destination is determined to be lower than a predetermined threshold value from destination candidates to be estimated as being a destination in the destination estimating step; an observed variable acquiring step of acquiring an observed variable; and a learning step of, taking the destination in the history as the destination candidate, learning a probability model for determining a probability of the plurality of destination candidates with respect to the observed variable. In this case, the candidate excluding step excludes a destination candidate for which, based on the history that is stored in the history storing step, it is determined that a certainty factor of being a destination is lower than a predetermined threshold value from the destination candidates that are used for learning in the learning step; and based on the probability model that is learned by the learning step, the destination estimating step determines a probability of the plurality of destination candidates with respect to the observed variable that is acquired in the observed variable acquiring step, and estimates a destination candidate having a high probability to be the destination.

According to this configuration also, since a location for which it is determined that a certainty factor of being a destination is lower than a predetermined threshold value is not included in destinations estimated by the destination estimating step, the accuracy of estimating a destination improves. Further, according to this configuration, learning of a probability model based on a history is performed in the learning step and estimation of a destination based on the learned probability model is performed in the destination estimating step, and in the aforementioned learning step, a destination candidate for which a certainty factor is low is excluded. Hence, if destinations are estimated similarly to the conventional technology based on a probability model that is learned in this manner, destination candidates with a low certainty factor will no longer be estimated as being a destination.

According to the present invention, there is the excellent advantage that, since a location for which it is determined that a certainty factor of being a destination is lower than a predetermined threshold value is no longer estimated as being a destination, the accuracy of estimating a destination improves.

DETAILED DESCRIPTION OF THE PREFERRED EMBODIMENT

Figure 1:
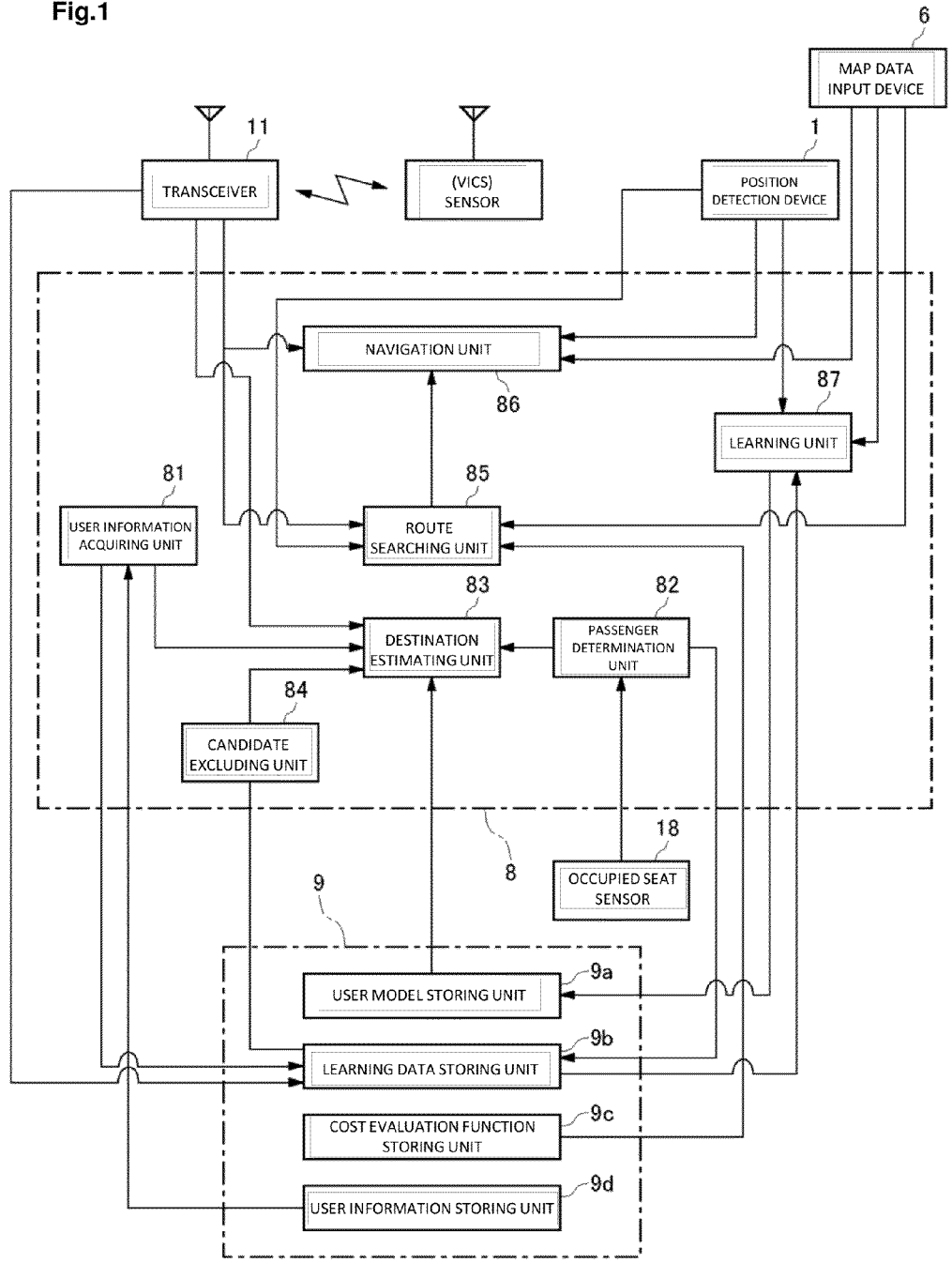
FIG. 1 is a block diagram that illustrates a configuration of principal parts of a navigation system according to an embodiment of the present invention.
Figure 2:
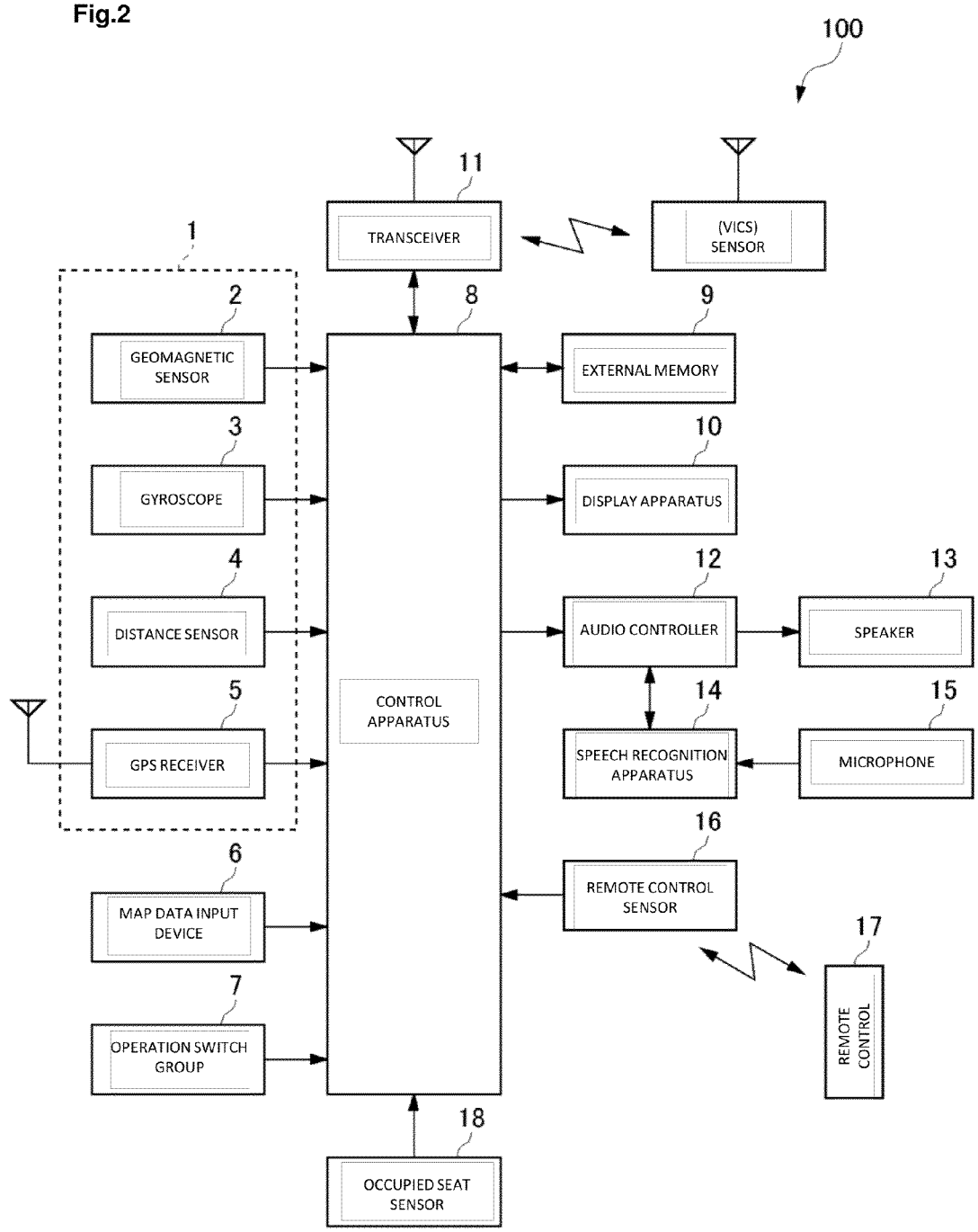
FIG. 2 is a block diagram that illustrates a configuration of the navigation system according to the embodiment of the present invention.

Hereunder, a navigation system according to an embodiment of the present invention is described with reference to the drawings. FIG. 1 is a block diagram that illustrates a configuration of principal parts of the navigation system according to the embodiment of the present invention. FIG. 2 is a block diagram that illustrates a configuration of the navigation system according to the embodiment of the present invention. First, the overall configuration of the navigation system according to the present embodiment will be described referring to FIG. 2.

A navigation system 100 also functions as a destination estimating apparatus by means of a partial configuration thereof. As shown in FIG. 2, the navigation system 100 includes a position detection device 1, a map data input device 6, an operation switch group 7, an external memory 9, a display apparatus 10, a transceiver 11, an audio controller 12, a speaker 13, a speech recognition device 14, a microphone 15, a remote control sensor 16, a remote control terminal (hereunder, referred to as "remote control") 17, an occupied seat sensor 18, and a control apparatus 8 to which each of these devices is connected.

The position detection device 1 has a geomagnetic sensor 2 for detecting the absolute orientation of a vehicle, a gyroscope 3 for detecting the relative orientation of a vehicle, a distance sensor 4 that detects a travelling distance of the vehicle, and a GPS receiver 5 for the global positioning system (GPS) that measures a position of the vehicle based on radio waves from satellites. Each of these sensors and the like 2, 3 4 and 5 is a known device. Each of the sensors and the like 2, 3, 4 and 5 has errors that are different in property. Therefore, position detection device 1 is configured so as to use the multiple sensors and the like 2, 3, 4 and 5 to complement each other. In this connection, depending on the respective accuracies, the position detection device 1 may be constructed using part of the above described sensors and the like. Further, the position detection device 1 may also use a steering wheel rotation sensor and speed sensors for respective rolling wheels and the like which are not shown in the drawings.

The map data input device 6, for example, includes a storage medium such as a DVD-ROM, a CD-ROM, a flash memory, or a hard disk, that is not shown in the drawings. Digital map data that includes road data, background data, character data and facilities data and the like is stored in the storage medium. The map data input device 6 inputs the aforementioned data to the control apparatus 8.

The operation switch group 7 includes a touch panel that is integrated with the display apparatus 10, and is used for various input operations such as changing the scale of a map that is displayed on the display apparatus 10, making a menu display selection, setting a destination, instructing a route search, starting route guidance, modifying the current position, changing the display screen, and adjusting the audio volume. One part or all of the switches in the operation switch group 7 may be mechanical switches that are provided in the vicinity of the display apparatus 10.

A plurality of operation switches that are not shown in the drawings are provided on the remote control 17, and input operations that are the same as those of the operation switch group 7 can be performed by operating the operation switches of the remote control 17. A signal that represents an input operation that has been input to the remote control 17 is supplied to the control apparatus 8 through the remote control sensor 16.

The external memory 9 is, for example, a memory card or a hard disk, and includes a write enabled storage medium. Various kinds of data such as a home position that is set by a user, text data, image data, and audio data is stored on the external memory 9.

The display apparatus 10 is constituted by, for example, a liquid crystal display or an organic electroluminescence (EL) display. In a predetermined map display region of the display apparatus 10, a vehicle position mark that corresponds to the current position of the vehicle is displayed in a superimposed manner on a road map of the area around the vehicle that is generated by means of the map data. The display apparatus 10 can also additionally display other information such as the current time and congestion information.

The transceiver 11 is a communication device for making a communication connection with outside. The transceiver 11 is connected to a VICS (Vehicle Information and Communication System) sensor that receives road traffic information (including traffic congestion information and traffic restrictions information), weather information, date information, day of the week information, facilities information, and advertising information that is supplied from a VICS center through beacons that are constructed/laid on roads or through an FM broadcasting station. The transceiver 11 transmits the road traffic information and the like to the control apparatus 8. Further, information that has been processed by the control apparatus 8 can be output from the transceiver 11. In this connection, the transceiver 11 may also be connected to the Internet, and receive road traffic information and the like through the Internet.

The speaker 13 externally outputs predetermined sounds (such as speech for guidance, an explanation of screen operations, and speech recognition results) based on an audio output signal that is received from the audio controller 12.

The microphone inputs speech that was uttered by an operator into the speech recognition device 14 in the form of an electric signal. The speech recognition device 14 collates the input speech of the operator that is supplied from the microphone 15 with lexical data (comparison pattern) in a recognition dictionary (not shown) stored in the speech recognition device, and outputs lexical data having the highest degree of coincidence with the input speech as a recognition result to the audio controller 12.

The audio controller 12 controls the speech recognition device 14, and also controls talk-back output (audio output) via the speaker 13 to the operator that supplied the speech input. The audio controller 12 also performs processing that inputs a recognition result of the speech recognition device 14 to the control apparatus 8.

The occupied seat sensor 18 detects whether or not there is an occupant in each seat, and outputs an occupant signal indicating the existence or non-existence of an occupant to the control apparatus 8.

The control apparatus 8 is an ordinary computer, and includes therein a known CPU, ROM, RAM and input-output device, as well as a bus line for connecting these components. A program that is executed by the control apparatus 8 is written in the ROM. The CPU and the like execute predetermined arithmetic operations in accordance with the program.

Based on information from the speech recognition device 14, the control apparatus 8 executes predetermined processing with respect to an utterance of the operator and predetermined processing with respect to an input operation at the operation switch group 7 or the remote control 17 (for example, processing that stores map data on the external memory 9, processing that changes the map scale, menu display selection processing, destination setting processing, route search execution processing, route guidance processing, current position adjustment processing, processing that changes the display screen, volume adjustment processing, and the like). Furthermore, route guidance sound information and the like processed by the control apparatus 8 is appropriately supplied to the operator from the speaker 13 through the audio controller 12.

FIG. 1 is a block diagram that illustrates a configuration of principal parts of the navigation system 100 according to the embodiment of the present invention. The external memory 9 includes a user model storing unit 9a, a learning data storing unit 9b, a cost evaluation function storing unit 9c, and a user information storing unit 9d. The user model storing unit 9a is a region that stores a Bayesian network model as a probability model.

Figure 3:
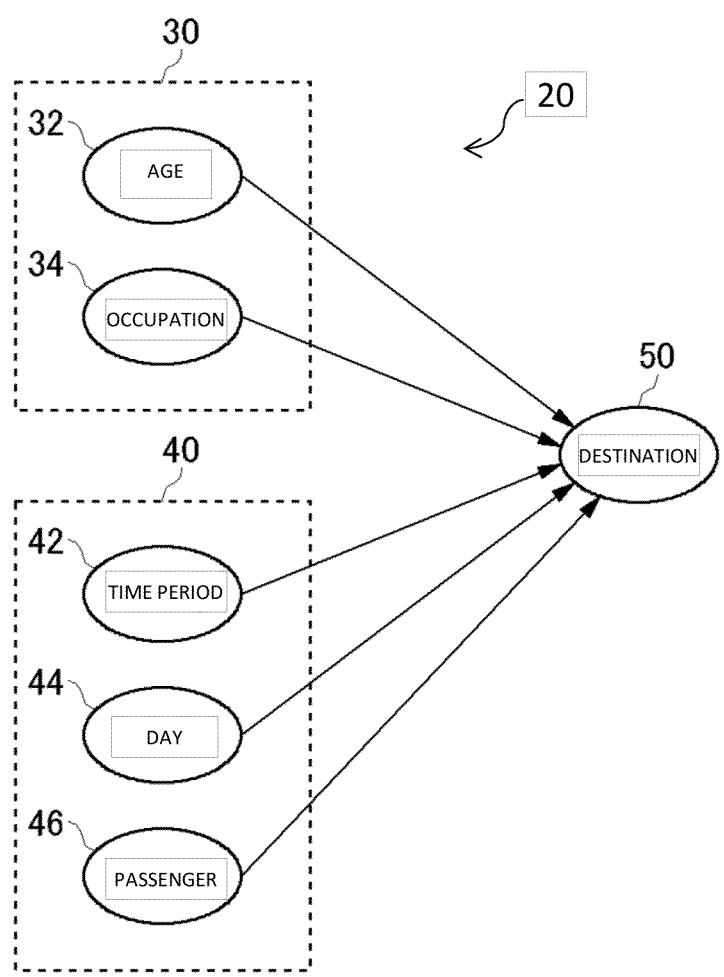
FIG. 3 is a view that illustrates a Bayesian network model according to the embodiment of the present invention.

FIG. 3 is a view that illustrates a Bayesian network model stored in the user model storing unit 9a. The Bayesian network model 20 has an age node 32 and an occupation node 34 as a user information node 30, has a time period node 42, a day node 44, and a passenger node 46 as a situation information node 40, and has a destination node 50 as a child node that takes the aforementioned nodes as parent nodes.

The age node 32 takes a natural number that corresponds to the age of the driver. The occupation node 34 takes a many kinds of occupation names (states) that are previously determined. The time period node 42 takes a plurality of states obtained by separating 24 hours into a plurality of time periods (for example, into periods of four hours, periods of two hours, periods of one hour, or the like). The day node 44 takes seven states that represent days from Monday to Sunday. The passenger node 46 takes two states, namely, "with passenger" and "without passenger". These nodes 32, 34, 42, 44 and 46 are observed variables.

The destination node 50 takes a plurality of destination candidates (state) that are set by learning. Each parent node and the child node are connected as shown by respective arrows. The respective arrows show the conditional dependence between the node that is the origin of the arrow and the node that is the arrow destination. Conditional probabilities are set that correspond to the individual arrows.

When user information (age and occupation) and situation information (time period, day of the week, and existence or non-existence of a passenger) is applied to the Bayesian network model 20 configured in this manner, the probability (likelihood) of each destination candidate of the destination node 50 is obtained.

Returning to FIG. 1, the learning data storing unit 9b is a region that stores learning data for learning (amending) the Bayesian network model 20. The learning data is data that takes an age, an occupation, a time period, a day of the week, and a value for existence or non-existence of a passenger that have been actually input into the Bayesian network model 20 when estimating a destination, and a location that was actually specified as a destination and the date as a single set. Thus, the learning data storing unit 9b is a unit that stores the history of a location that has been specified as a destination, and corresponds to the history storing unit of the present invention.

The cost evaluation function storing unit 9c is a region that stores a cost evaluation function Ci shown in equation (1) below that is used to search for a route from the current position of the vehicle to a destination.

$$Ci = \alpha * l(i) + \beta * t(i) + \gamma * w(i) + \delta * n(i) \qquad (1)$$

In equation (1), l(i) represents distance cost, t(i) represents average travel time cost, w(i) represents road width cost, and n(i) represents right/left turn frequency cost. Further, coefficients $\alpha$, $\beta$, $\gamma$, and $\delta$ are weighting factors that are previously set. In this connection, the cost evaluation function Ci shown in equation (1) represents one example of a cost evaluation function Ci. The cost evaluation function Ci may include parameters other than the distance, average travel time, road with, and right/left turn frequency (such as, for example, a speed limit or the number of traffic signals).

The user information storing unit 9d is a region that stores a date of birth of a user for determining the age of the user and an occupation of a user as user information for a plurality of users in association with the user names. In this connection, although the age of a user changes once a year, since the age is defined based on the date of birth of the user that is information that does not change, if the current date is determined, the date of birth can be used as permanent information of the user, that is, user information. In this manner, the user information may include not only permanent information with regard to the user, but also information that can be defined based on the permanent information. Accordingly, the user information may also include information regarding the user that does not change during a single year (for example, annual income).

The control apparatus 8 includes a user information acquiring unit 81, a passenger determination unit 82, a destination estimating unit 83, a candidate excluding unit 84, a route searching unit 85, a navigation unit 86, and a learning unit 87.

The user information acquiring unit 81 determines who the driver of the vehicle is, acquires the date of birth and occupation of the driver from the user information storing unit 9d, and determines the age of the user based on the date of birth and the current date. Regarding a method for determining which person is the driver, in this case, a list of a plurality of users that have been previously registered is displayed on the display apparatus 10, and the driver selects the corresponding user from the list that is displayed on the display apparatus 10 by operating the operation switch group 7 or the remote control 17. Since the user information is an observed variable in the Bayesian network model 20, the user information acquiring unit 81 corresponds to an observed variable acquiring unit.

The passenger determination unit 82 determines the existence or non-existence of a passenger based on a signal supplied from the occupied seat sensor 18. In this connection, since the existence or non-existence of a passenger is an observed variable in the Bayesian network model 20, the passenger determination unit 82 corresponds to an observed variable acquiring unit. Although the destination estimating unit 83 executes processing to estimate a destination when a destination is not set by a user, even when a destination is set by a user, the destination estimating unit 83 may also execute processing to estimate a stopover location as an intermediate destination on the way to the destination.

The destination estimating unit 83 inputs an age and an occupation that are acquired by the user information acquiring unit 81, a time period that is determined on the basis of a signal from an unshown clock that is provided inside the vehicle, day of the week information obtained through the transceiver 11, and information regarding existence or non-existence of a passenger that is determined by the passenger determination unit 82 to the age node 32, the occupation node 34, the time period node 42, the day node 44, and the passenger node 46 of the Bayesian network 20, respectively, to determine the likelihood with respect to each destination candidate of the destination node 50. In this connection, since the day of the week information obtained through the transceiver 11 is an observed variable in the Bayesian network model 20, the transceiver 11 corresponds to an observed variable acquiring unit.

The candidate excluding unit 84 excludes a destination candidate for which it is determined that a certainty factor is lower than a predetermined threshold value from destination candidates estimated as being a destination by the destination estimating unit 83. The destination estimating unit 83 estimates a destination candidate for which the likelihood is highest among the remaining destination candidates after some destination candidates are excluded by the candidate excluding unit 84 to be the destination.

The aforementioned term "certainty factor" refers to a degree of certainty that the relevant destination candidate is a location the user goes to on a routine basis. More specifically, the destination estimating unit 83 excludes destination candidates the user does not go to on a routine basis, and estimates a destination candidate for which the likelihood is highest to be the destination. Whether the certainty factor is higher or lower than a predetermined threshold value is determined on the basis of learning data that is stored in the learning data storing unit 9b, that is, a past history. Destination candidates for which the certainty factor is high include locations the user actually goes to on a routine basis and locations that there is a possibility of the user going to on a routine basis.

The candidate excluding unit 84 determines the certainty factor, that is, the degree of certainty that the relevant destination candidate is a location the user goes to on a routine basis not only from the viewpoint of simply how many times in the past the relevant destination candidate was specified as a destination based on the history, but also on the basis of the dates and times (may be based only on the dates) that the relevant destination candidate was specified as a destination that are included in the history. More specifically, according to the present embodiment, the certainty factor may be determined based on: (a) a proportion of times that the relevant destination candidate was specified as a destination with respect to a fixed number of most recent actions; (b) a number of actions since a day that the relevant destination candidate was last specified as a destination; (a') a proportion of times that the relevant destination candidate has been specified as a destination with respect to actions in a most recent fixed period of time; or (b') a time period since a day that the relevant destination candidate was last specified as a destination.

The certainty factor may be a continuous value or may be a discrete value. For example, regarding (a), a proportion of times that the relevant destination candidate was specified as a destination with respect to a fixed number of most recent actions may be used as it is as the certainty factor, or the certainty factor may take a value of 0, 1, or 2 for cases where the proportion of times the relevant destination candidate was specified as a destination with respect to the fixed number of most recent actions is 0%, between 0 and 50%, and between 50 and 100%, respectively.

The above described (a) is a condition for determining a location that the user actually goes to on a routine basis. For example, in the case of a location the user goes to habitually once a year, although the frequency of going to that location increases as the result of learning the travel history over several years and consequently the proportion of times the user goes to that location in the overall travel history increases, it is not appropriate to treat this kind of location as a location the user goes to on a routine basis.

Therefore, in (a), the certainty factor is determined based on the proportion of times that the relevant destination candidate was specified as a destination with respect to a fixed number of most recent actions. For example, assuming that one round-trip action is made every day (two actions every day), in a case where, in the most recent month (number of actions is 60), a location the user goes to at a rate of one time or more in every two week period is taken as a location the user goes to on a routine basis (certainty factor: 1), and a location the user goes to at a rate of one time or more every two days is taken as a location the user goes to on a routine basis and at frequent intervals (certainty factor: 2), when a proportion of times a location was specified as a destination with respect to the most recent 60 actions is 0% or more and 4% or less, the certainty factor for that location can be taken as 0, when the aforementioned proportion is 4% or more and 25% or less, the certainty factor for that location can be taken as 1, and when the aforementioned proportion is 25% or more the certainty factor for that location can be taken as 2.

Further, the above described (b) is a condition for determining a location for which there is a possibility that the user will go to on a routine basis. More specifically, even if a location is one which the user has only gone to once prior to the current time, if that is a location that the user went to quite recently, it can be considered that at the current time there is a high possibility of the user going there again (that is, going there on a routine basis from now on). Conversely, for example, in the case of a location that the user used to go to at frequent intervals several years previously but has not gone to at all recently, although in some cases a proportion of times of going to that location may be high with respect to the overall travel history, it can be considered that at the current time there is a low possibility of the user going there again (that is, the user has stopped going there on a routine basis).

Therefore, in (b), the certainty factor is determined based on a number of actions during a period from a day that the relevant destination candidate was last specified as a destination until the current time. For example, in a case as described above in which it is assumed that the user makes one round-trip action every day (two actions every day), when the number of actions from the day that the relevant destination candidate was last specified as a destination until the current time is less than three times, the certainty factor can be set to 2, when the aforementioned number of actions is three or more and less than 14, the certainty factor can be set to 1, and when the aforementioned number of actions is 14 or more the certainty factor can be set to 0.

The above described (a') and (b') are conditions obtained by replacing a number of operations in (a) and (b) with a time period, respectively. A certainty factor may also be determined by appropriately combining (a) or (a') and (b) or (b'). For example, by combining (a) and (b'), even when the proportion of times the relevant destination candidate was specified as a destination with respect to a fixed number of most recent actions (a) is relatively small, if a time period since a day that the relevant destination candidate was last specified as a destination (b') is short, it can be assumed that there is a high possibility that the user is going there again at the present time. Further, if the proportion of times the relevant destination candidate was specified as a destination with respect to a fixed number of most recent actions (a) is large, even if a time period since a day that the relevant destination candidate was last specified as a destination (b') is long, it is possible to adopt a flexible approach that assumes that the possibility of the relevant destination candidate being specified as the destination is not low.

In this connection, a fixed number of actions in the above described (a) and a fixed period of time in (a') may be adjusted according to the action frequency of the user. More specifically, when the action frequency of the user is high, the fixed number of actions in (a) may be increased or the fixed period of time in (a') may be shortened. In contrast, when the action frequency of the user is low, the fixed number of actions in (a) may be decreased or the fixed period of time in (a') may be lengthened.

Among destination candidates that can be estimated as being a destination at the destination estimating unit 83, the candidate excluding unit 84 excludes a destination candidate for which the certainty is less than a predetermined threshold value. Since a history that includes dates is stored as learning data in the learning data storing unit 9b as described above, by referring to the learning data the candidate excluding unit 84 can acquire the above described (a), (b), (a') or (b'). The destination estimating unit 83 estimates a destination candidate for which the likelihood is highest among the remaining destination candidates after some of the destination candidates are excluded by the candidate excluding unit 84 to be the destination. The destination estimating unit 83 outputs the estimated destination to the route searching unit 85.

Based on map data that is input from the map data input device 6, the route searching unit 85 searches for a route from the current position of the vehicle that is detected by the position detection device 1 to the destination estimated by the destination estimating unit 83. The route search is carried out by means of known technique such as, for example, the Dijkstra method using the cost evaluation function Ci shown in equation (1) that is stored in the cost evaluation function storing unit 9c to search for a route such that the value of the cost evaluation function Ci shown in equation (1) is the minimum value.

The route searching unit 85 acquires road traffic information including traffic congestion information and traffic restrictions information from the transceiver 11, and if relevant traffic congestion information or traffic restrictions information is acquired, the route searching unit 85 searches for the optimal route in consideration of the traffic congestion information or traffic restrictions information. More specifically, if relevant traffic congestion information or traffic restrictions information exists, the route searching unit 85 searches for the optimal route so as to avoid the traffic congestion or traffic restrictions. Further, if related information that relates to a route found by the search exists, the route searching unit 85 outputs the related information by displaying the related information on the display apparatus 10 or by audio output using the speaker 13. For example, if information exists regarding an event at a facility along the route, the route searching unit 85 presents the information to the user at an appropriate timing. At this time, the display apparatus 10 or speaker 13 corresponds to a related information presenting unit.

The navigation unit 86 executes route guidance based on the route that has been found by the route searching unit 85, the current position of the vehicle that is successively detected by the position detection device 1, and map data from the map data input device 6.

The learning unit 86 executes learning of the Bayesian network model 20 based on learning data stored in the learning data storing unit 9b. The learning unit 86 may execute learning when new learning data is added, or may periodically execute learning at predetermined learning cycles. As described above, the learning data stored in the learning data storing unit 9b is data in which age, occupation, time period, day of the week, existence or non-existence of a passenger, location actually specified as the destination, and the date form a single set. This learning data is added to the learning data storing unit 9b each time a destination is determined. In this connection, although the date information in the learning data is not used in the learning process of the Bayesian network model 20, as described above, the date information is used by the candidate excluding unit 84 when excluding a destination candidate for which the certainty factor is lower than a predetermined threshold value from the destination candidates.

Determination of a destination is performed as follows. First, in a case in which a destination was estimated, when it is determined that the user parked the vehicle after travelling, the parking position is determined as being the destination. Further, in a case where a destination was set by the user, the destination that was set is determined as being the destination. The age and occupation to be stored as learning data are obtained from the user information acquiring unit 81, existence or non-existence of a passenger is obtained from the passenger determination unit 82, and the date and day of the week are obtained from the transceiver 11.

Figure 4:
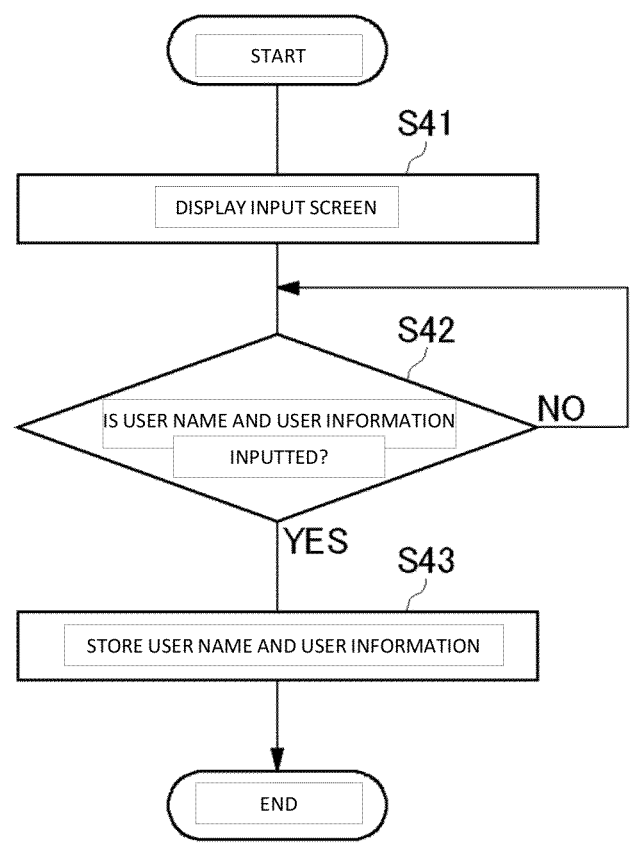
FIG. 4 is a flowchart of a process for storing user information according to the embodiment of the present invention.

FIG. 4 is a flowchart of a process for storing user information in the user information storing unit 9d of the external memory 9. First, a predetermined input screen is displayed on the display apparatus 10 to cause the user to input a user name, user information, and information for verifying the user information (that is, date of birth and occupation) (step S41).

Next, it is determined whether or not the user name, date of birth, and occupation have been inputted by a user operation (step S42). Subsequently, if the user name, date of birth, and occupation have been inputted (Yes in step S42), the inputted user name, user information and information for verifying the user information are stored in the user information storing unit 9d of the external memory 9 (step S43).

Figure 5:
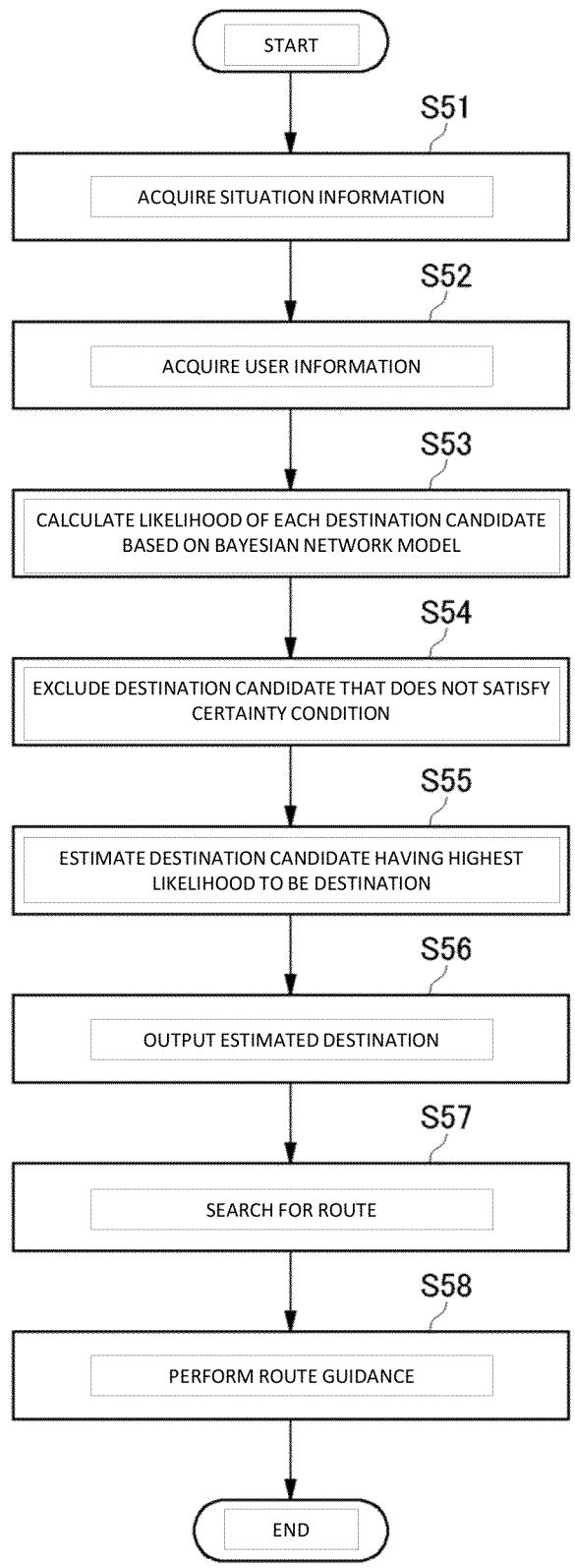
FIG. 5 is a flowchart of a process for performing destination estimation and a route search according to the embodiment of the present invention.

FIG. 5 is a flowchart of a process for performing destination estimation and a route search. First, the passenger determination unit 82 and the transceiver 11 acquire situation information, store the situation information in the learning data storing unit 9b, and output the situation information to the destination estimating unit 83 (step S51). For this purpose, the passenger determination unit 82 determines the existence or non-existence of a passenger based on a signal from the occupied seat sensor 18. Further, the transceiver 11 acquires day of the week information, and also acquires a signal from the clock provided inside the vehicle and determines the time period. In this connection, the transceiver 11 also acquires date information at this time, and stores the date information in the learning data storing unit 9b.

Next, the user information acquiring unit 81 acquires user information, stores the user information in the learning data storing unit 9b, and outputs the user information to the destination estimating unit 83 (step S52). For this purpose, the user information acquiring unit 81 displays a user list that shows a list of users for whom user information is stored in the user information storing unit 9d of the external memory 9 on the display apparatus 10, and reads out from the user information storing unit 9d a date of birth and an occupation relating to a user that is selected from the user list by an operation of the operation switch group 7 or the remote control 17. The age of the driver is then determined based on the date of birth that is read out and the signal acquired from the clock in the above described step S51.

Next, the destination estimating unit 83 inputs the situation information (time period, day of the week, and existence or non-existence of a passenger) acquired in the above described step S51 and the user information (age and occupation) acquired in step S52 into the Bayesian network model 20 that is stored in the user model storing unit 9a of the external memory 9, and calculates a likelihood with respect to each destination candidate of the destination node 50 (step S53). Thereafter, the candidate excluding unit 84 excludes destination candidates for which a certainty factor is less than a predetermined threshold value (step S54).

Subsequently, the destination estimating unit 83 estimates a destination candidate for which a likelihood is highest among the destination candidates that remain after destination candidates for which the certainty factor is less than a predetermined threshold value have been excluded in step S54 to be the destination (step S55). Thereafter, the destination estimating unit 83 outputs the estimated destination to the route searching unit 85 and display apparatus 10 (step S56).

Next, the route searching unit 85 uses the Dijkstra method or the like to search for a route from the current position of the vehicle that is detected by the position detection device 1 to the destination that is estimated in step S55 so that the total cost of the evaluation function Ci shown in equation (1) is the minimum cost (step S57). At this time, if related information such as traffic congestion information or traffic restrictions information exists, the route searching unit 85 takes that related information into consideration when searching for a route. Subsequently, the navigation unit 86 executes route guidance based on the route that is found by the search operation in step S57, the current position of the vehicle that is successively detected by the position detection device 1, and map data from the map data input device 6 (step S58).

Figure 6:
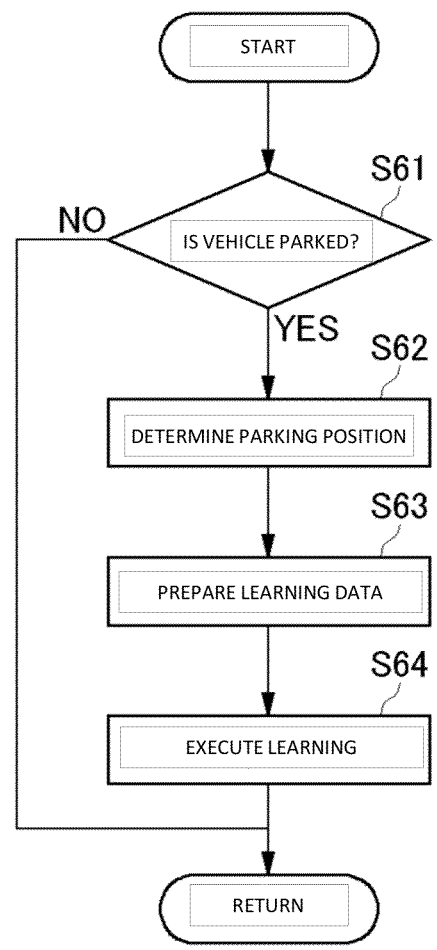
FIG. 6 is a flowchart of a process for performing learning based on actual actions according to the embodiment of the present invention.

FIG. 6 is a flowchart of a process for performing learning based on actual actions. First, processing is performed to establish whether or not it has been determined that the vehicle is parked (step S61). Although in this case it is assumed that a determination as to whether or not the vehicle is parked is made based on whether the vehicle position that is successively detected by the position detection device 1 has been at the same location for a predetermined period of time, it is also possible determine whether or not the vehicle is parked based on whether the ignition key is turned on or off.

If it is determined that the vehicle is not parked (No in step S61) the present routine temporarily ends. In contrast, if it is determined that the vehicle is parked (Yes in step S61), the current vehicle position that is detected by the position detection device 1 is taken to be the parking position, and the parking position is stored in the learning data storing unit 9b (step S62).

Next, learning data for learning the Bayesian network model 20 is prepared (step S63). The learning data is a set of data having one data item for the state of each of the nodes 32, 34, 42, 44, 46 and 50 of the Bayesian network model 20. The states of the age node 32 and the occupation node 34 are stored in the learning data storing unit 9b in step S52 in FIG. 5, and the states of the time period node 42, the day node 44 and the passenger node 46 are stored in the learning data storing unit 9b in step S51 in FIG. 5. The state of the destination node 50 is represented by the parking position stored in step S62 in FIG. 6.

Next, using the learning data prepared in step S63, a dependence probability between the parent nodes and the child node of the Bayesian network model 20 that is stored in the user model storing unit 9a is amended (learned) (step S64). By repeating this learning, the accuracy of estimating the purpose and destination gradually improves.

As described above, according to the navigation system 100 of the present embodiment, the destination estimating unit 83 determines a likelihood with regard to respective destination candidates by inputting user information and situation information into the Bayesian network model 20. At that time, a destination candidate for which a certainty factor is less than a predetermined threshold value is excluded, and a destination candidate having the highest likelihood is estimated to be the destination. Hence, it is possible to compensate for the incompleteness of Bayesian inference using the Bayesian network model 20, and avoid estimating that a destination candidate that is not a location the user goes to on a routine basis is a destination.

According to the above described embodiment, the learning unit 87 performs learning using the entire past travel history as learning data, amends the Bayesian network model 20, and applies the user information and situation information to the amended Bayesian network model 20 to determine a likelihood with respect to each destination candidate. Since destination candidates for which the certainty factor is less than a predetermined threshold value are included in the destination candidates, such destination candidates are excluded and the destination candidate with the highest likelihood is estimated to be the destination. However, the present invention is not limited to this embodiment.

In a navigation system according to a modification example, the learning unit 87 may compare a certainty factor with a predetermined threshold value with respect to data (data in which age, occupation, time period, day of the week, existence or non-existence of a passenger, location actually specified as the destination, and the date form a single set) stored in the learning data storing unit 9b, and may amend (execute learning with respect to) the Bayesian network model 20 using only data for which the certainty factor is higher than the threshold value as learning data. In this case, among the respective destination candidates obtained by applying user information and situation information to the Bayesian network model 20, the destination estimating unit 83 takes the destination candidate having the highest likelihood, as it is, as the estimation result.

Figure 7:
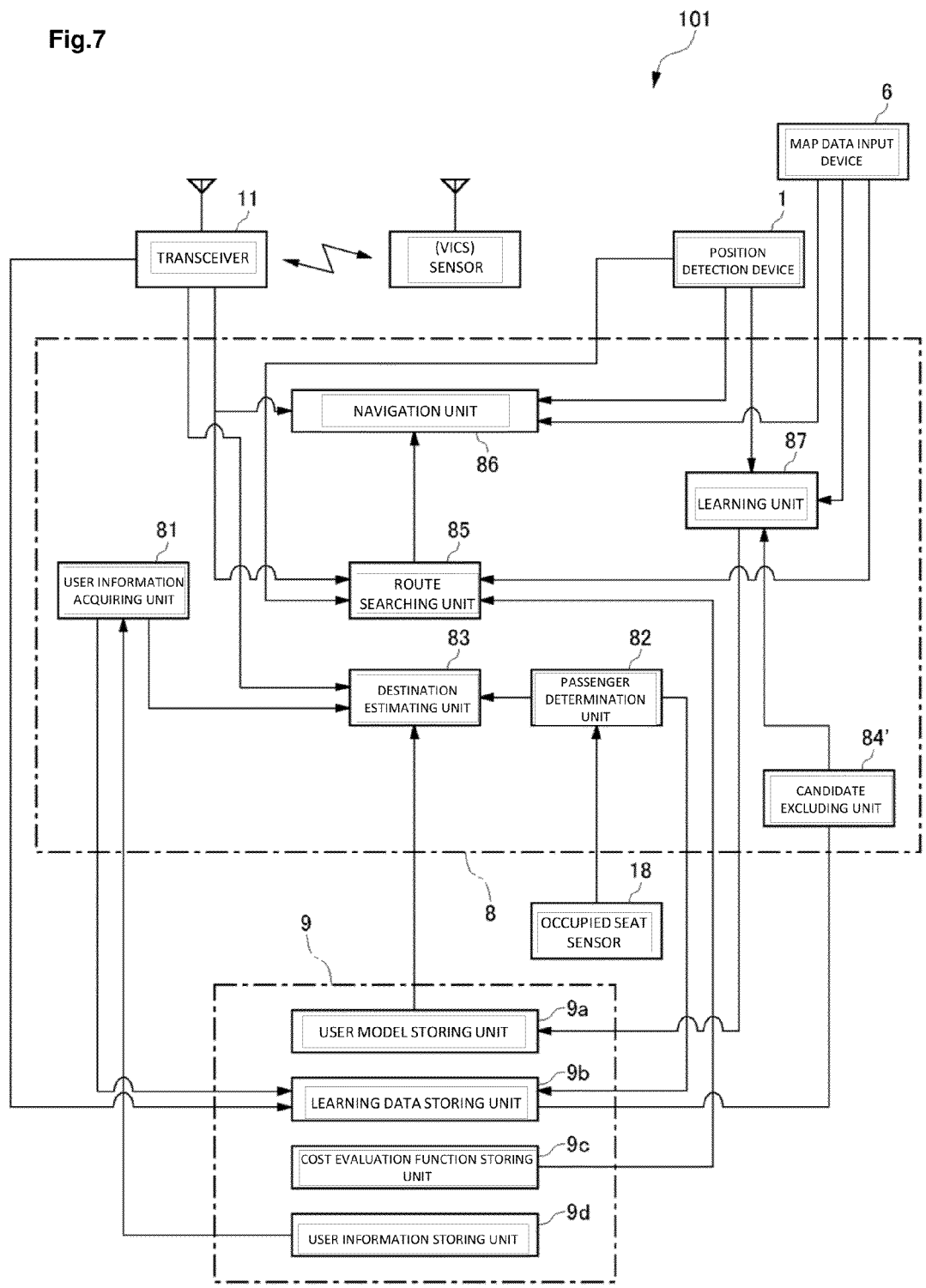
FIG. 7 is a block diagram that illustrates a configuration of principal parts of a navigation system according to a modification example of the embodiment of the present invention.
Figure 8:
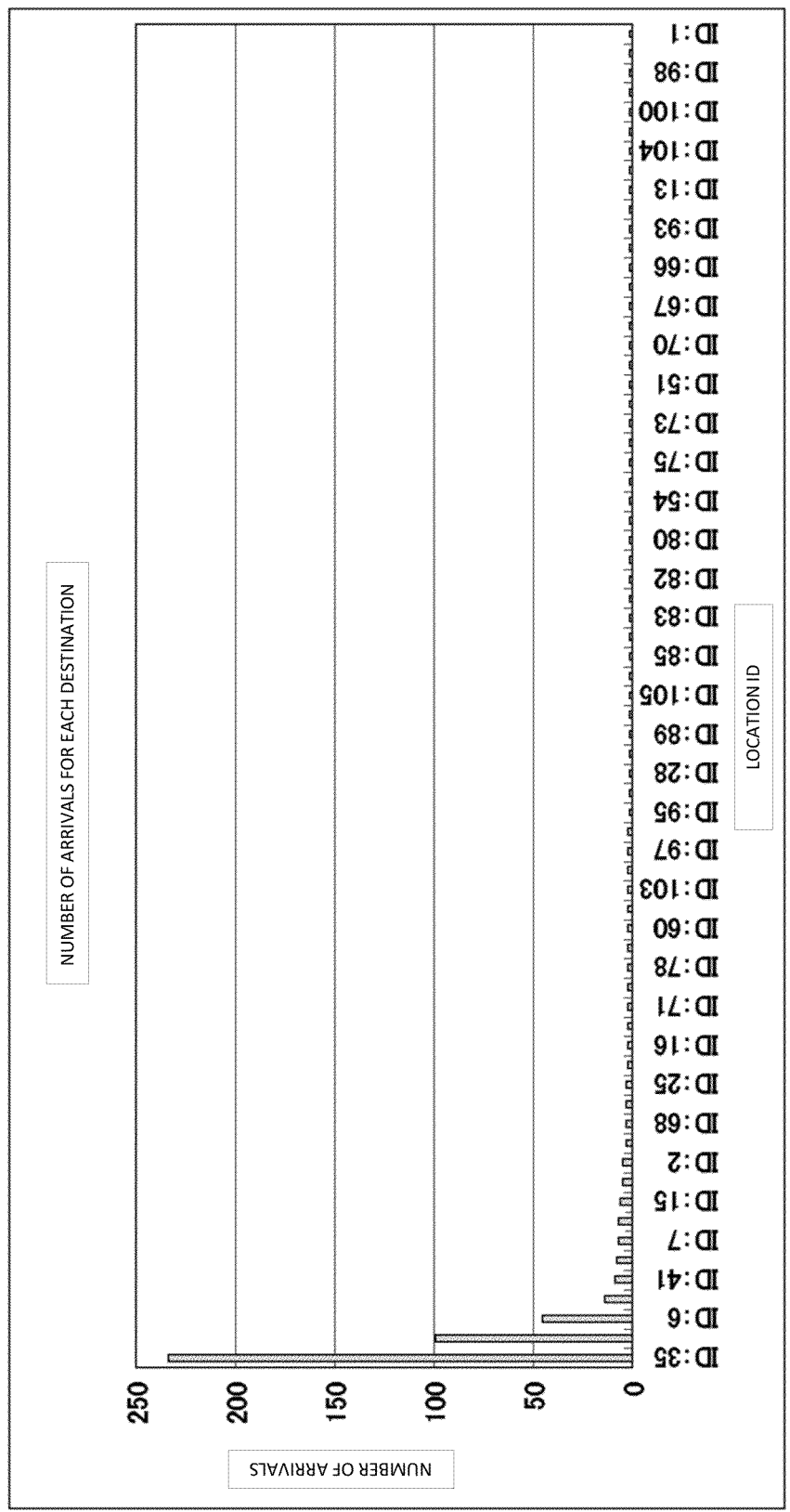
FIG. 8 is a graph that illustrates an example of a number of arrivals with respect to each destination in a history of past destinations.

FIG. 7 is a block diagram that illustrates a configuration of principal parts of a navigation system according to a modification example of the present invention. In a navigation system 101 of the modification example, a candidate excluding unit 84' is provided between the learning data storing unit 9b and the learning unit 87. The candidate excluding unit 84' employs one of the above described determining conditions to exclude learning data that does not satisfy the determining condition among the learning data stored as a past history in the learning data storing unit 9b, and outputs the remaining learning data to the learning unit 9b.

Further, according to the above described embodiment, although a destination candidate having the highest likelihood is estimated to be the destination (step S55), and route searching (step S57) and route guidance (step S58) to that destination are automatically performed, a configuration may also be adopted in which a plurality of destination candidates are displayed on the display apparatus 10 in the order of highest likelihood, and the user is caused to select a destination. When the user selects a destination, the destination is confirmed at that time point, similarly to when the user sets a destination by a user operation in the ordinary manner.

Although in the above described embodiment, route guidance is automatically performed after the destination is estimated (step S58), since it can be considered that the reason the user does not actively set the destination is that the user is familiar with the route to the destination, a configuration may also be adopted in which route guidance is not performed, and only when related information that relates to the route obtained by the route search (step S57) exists, the related information is presented to the user. Alternatively, a configuration may be adopted so that route guidance is performed after a detour route has been found, only in a case where a detour route is presented to the user that is based on related information that relates to a route that was found as the result of performing the route search (step S57). Thus, the inconvenience of guidance being started automatically with respect to a route that the user is familiar with can be avoided, and the user can also be presented with useful information if such information exists.

In addition, although in the above described embodiment the user information acquiring unit 81 determines who the driver is by displaying a list of a plurality of preregistered users on the display apparatus 10 and having the driver make a selection from the list, in a case where a seat is electrically driven and there is a memory function that stores the seat position such that a seat position is stored for each user, a configuration may be adopted that determines who the driver is in response to utilization of the memory function.

Further, although in the above described embodiment the Bayesian network model 20 is used to determine the probability of each destination candidate, another probability model such as a neural network model may be used. Naturally, an observed variable of the Bayesian network model 20 can also be changed as appropriate. Further, although according to the above described embodiment a probability model is described in which user information and situation information are used as an observed variable, a configuration may also be adopted in which only situation information or only user information is used as an observed variable.

Furthermore, although a plurality of certainty factors are exemplified in the above described embodiment, a certainty factor is not limited to the certainty factors exemplified in the above description. A certainty factor may be any factor that enables exclusion of a destination candidate that is determined as not being a location the user goes to routinely based on a past history. For example, a certainty factor may be determined based on a proportion of times that the relevant destination candidate has been specified as a destination with respect to the past history, or may be determined based on a number of times the relevant destination candidate has been specified as a destination in the past history. For example, a configuration may be adopted so as to exclude a destination candidate for which a proportion of times of being specified as a destination in the past history is less than 10%, or to exclude a destination candidate for which a number of times of being specified as a destination in the past history is less than three (is once or twice).

Further, although according to the above described embodiment the learning data is added as a history to the learning data storing unit 9b each time a destination is determined, at such time, the history may assigned a weight in accordance with various conditions and stored.

The history of a location specified as a destination in the past has weight data for each history record. More specifically, although according to the above described embodiment all the records in the history had the same weight, according to the present modification example the records have different weights in accordance with various circumstances, such as, for example, a weight corresponding to specification as a destination 1.5 times, a weight corresponding to specification as a destination 0.5 times and the like. The weights are assigned, for example, in accordance with whether or not the relevant location was specified as a destination as the result of the user setting the location as a destination, a distance from the place of departure to the relevant location, and whether or not the relevant location is a landmark. A specific example is described hereunder.

When a certain location is specified as a destination, if the location is determined to be the destination as the result of the location being set as the destination by the user, it is favorable to set a small weight, while if the location is determined to be the destination as the result of arriving at the location without the user setting a destination, it is favorable to set a large weight. For example, in the case of a location that is specified as a destination by the user performing an operation to set the location as the destination in the navigation system, a count for that location is updated on the basis that the user has gone to the location one time, while in the case of a location which the user does not set as a destination in the navigation system (including a case where the relevant location is estimated to be the destination), when the relevant location is reached, a count for that location is updated on the basis that the user has gone to the location twice. This is because it can be considered that there is a relatively high possibility that a location that the user set as a destination is a location that the user is not accustomed to going to, while in contrast, if the vehicle arrives at a location without the user setting the location as a destination, it can be considered that there is a relatively high possibility that the location is a location that the user is accustomed to going to.

Further, when a certain location has been specified as a destination, a weight may be assigned in accordance with a distance from the place of departure to the relevant location. For example, if a distance from the place of departure to the location specified as a destination is less than 1 km, a weight of 0.5 is assigned, if the distance is 1 km or more and less than 10 km, a weight of 1 is assigned, and if the distance is more than 10 km, a weight of 1.5 is assigned. In this connection, the distance may be the direct distance or may be the distance travelled along the route. The reason for assigning a larger weight in accordance with the length of distance from the place of departure to the location specified as the destination in this manner is that it is considered that when the distance from the place of departure to the location specified as the destination is long, there is a relatively high possibility that the user went there for a definite purpose, and conversely, it is considered that when the distance from the place of departure to the location specified as the destination is short, there is a relatively high possibility that the relevant location was specified as a destination for reasons such as the user happening to stop there.

Further, when a certain location has been specified as a destination, a weight may be assigned in accordance with whether or not the location is one at which many people gather (for example, a famous commercial establishment (a department store or the like), a recreational facility (amusement park, park or the like), or a tourist attraction). Whether or not a location is one at which many people gather may be determined, for example, according to the number of parking spaces or may be determined based on the subjective viewpoint of the user. Further, histories of locations that are specified as a destination by a plurality of users may be compiled, and the approximate number of people that actually specify the relevant location as a destination may be investigated to determine whether the relevant location is a location where a large number of people gather. For example, if the location specified as a destination is a location where a large number of people gather, a weight of 3 is assigned thereto, while if the location is not a location where a large number of people gather, a weight of 1 is assigned thereto. The reason for assigning a large weight to a location where a large number of people generally gather is that it can be considered that if a location is one where a large number of people gather, there is a relatively high possibility of the location being specified as a destination.

The candidate excluding unit 84 determines a certainty factor of being a destination in a similar manner to the above described embodiment. At that time, for example, when determining a proportion of times that the relevant location has been specified as a destination, the proportion is determined based on weights. For example, if it is assumed that, with respect to 10 actions, there is a history with a weight of 2 and a history with a weight of 1 as histories of a certain location, the proportion of times that the relevant location has been specified as a destination among the 10 actions is (2+1)/10=30%.

Note that, when a weight is assigned to a history as in the present modification example, the candidate excluding unit 84 does not take the date and time into consideration when determining the certainty factor as in the above described embodiment, but rather can determine a certainty factor without taking a date or time into consideration. That is, according to the present modification example, a certainty factor of destination candidates with respect to being specified as a destination can be determined without taking dates and times in the history into consideration, and a destination candidate for which the certainty factor is low can be excluded.

In this connection, a weight may be assigned based on only some of the group of factors including whether or not the relevant location was specified as a destination by the user setting the relevant location as a destination, a distance from the place of departure to the relevant location, and whether or not the relevant location is a location at which a large number of people gather, or may be assigned according to another factor.

The navigation system 100 may be a system that is mounted in a vehicle or may be a system of a type that is carried by a user.

The present invention has an effect of improving the accuracy of estimating a destination, and is useful as a destination estimating apparatus that takes locations that were specified as a destination in the past as destination candidates, and estimates a destination from among the destination candidates.

What is claimed is:

1. A destination estimating apparatus, comprising:
   a history storing unit that stores a history of a location that has been specified as a destination in the past;
   a destination estimating unit that estimates a destination from among a plurality of destination candidates including a location stored in the history storing unit;
   a candidate excluding unit that, based on the history that is stored in the history storing unit, excludes a destination candidate for which a certainty factor of being a destination is determined to be lower than a predetermined threshold value from destination candidates to be estimated as being a destination by the destination estimating unit;
   an observed variable acquiring unit that acquires an observed variable; and
   a model storing unit that stores a probability model for determining a probability of the plurality of destination candidates with respect to the observed variable;
   wherein:
      based on the probability model that is stored in the model storing unit, the destination estimating unit determines a probability of the plurality of destination candidates with respect to the observed variable that is acquired by the observed variable acquiring unit, and estimates a destination candidate having a high probability to be the destination; and
      based on the history that is stored in the history storing unit, the candidate excluding unit excludes a destination candidate for which the certainty factor is determined to be lower than a predetermined threshold value from the destination candidates for which a probability is determined by the destination estimating unit.

2. The destination estimating apparatus according to claim 1, wherein:
   date information is included in the history of a location that has been specified as a destination in the past that is stored in the history storing unit; and
   the candidate excluding unit excludes a destination candidate for which, based on the date information, it is determined that a certainty factor of being a destination is lower than a predetermined threshold value.

3. The destination estimating apparatus according to claim 2, wherein the certainty factor is determined based on a proportion of times that the relevant destination candidate has been specified as a destination with respect to a fixed number of most recent actions.

4. The destination estimating apparatus according to claim 2, wherein the certainty factor is determined based on a number of actions since a day that the relevant destination candidate has been last specified as a destination.

5. The destination estimating apparatus according to claim 2, wherein the certainty factor is determined based on a proportion of times that the relevant destination candidate has been specified as a destination with respect to actions in a most recent fixed period of time.

6. The destination estimating apparatus according to claim 2, wherein the certainty factor is determined based on a time period since a day that the relevant destination candidate has been last specified as a destination.

7. The destination estimating apparatus according to claim 2, wherein the certainty factor is determined based on a proportion of times that the relevant destination candidate has been specified as a destination with respect to a fixed number of most recent actions or a proportion of times that the relevant destination candidate has been specified as a destination with respect to actions in a most recent fixed period of time, and on a number of actions since a day that the relevant destination candidate has been last specified as a destination or a time period since a day that the relevant destination candidate has been last specified as a destination.

8. The destination estimating apparatus according to claim 1, wherein the certainty factor is determined based on a proportion of times that the relevant destination candidate has been specified as a destination with respect to all histories stored in the history storing unit.

9. The destination estimating apparatus according to claim 1, wherein the certainty factor is determined based on a number of times that the relevant destination candidate has been specified as a destination with respect to all histories stored in the history storing unit.

10. The destination estimating apparatus according to claim 1, wherein:
a weight is assigned to a history of a location specified as a destination in the past that is stored in the history storing unit; and
the weight is taken into consideration when determining the certainty factor.

11. The destination estimating apparatus according to claim 10, wherein the weight is assigned in accordance with whether or not the location specified as a destination has been specified as a destination as a result of a user setting the location as a destination.

12. The destination estimating apparatus according to claim 10, wherein the weight is assigned in accordance with a distance from a place of departure to the location.

13. The destination estimating apparatus according to claim 10, wherein the weight is assigned in accordance with whether or not the location is a location at which many people gather.

14. A navigation system, comprising:
a destination estimating apparatus according to claim 1; and
a route searching unit that searches for a route to a destination that is estimated by the destination estimating unit.

15. The navigation system according to claim 14, further comprising a related information presenting unit that presents related information that relates to a route that is found by a search operation of the route searching unit.

16. The navigation system according to claim 14, wherein the route searching unit searches for a route based on related information that includes traffic congestion information and traffic restrictions information.

17. A destination estimating apparatus, comprising:
a history storing unit that stores a history of a location that has been specified as a destination in the past;
a destination estimating unit that estimates a destination from among a plurality of destination candidates including a location stored in the history staling unit;
an observed variable acquiring unit that acquires an observed variable;
a model storing unit that stores a probability model for determining a probability of the plurality of destination candidates with respect to the observed variable; and
a learning unit that, taking the location that has been specified as a destination in the history as the destination candidate, learns the probability model that is stored in the model storing unit; and
a candidate excluding unit that, based on the history that is stored in the history storing unit, excludes a destination candidate for which a certainty factor of being a destination is determined to be lower than a predetermined threshold value from the destination candidates that are used for learning by the learning unit;
wherein:
based on the probability model that is stored in the model storing unit, the destination estimating unit determines a probability of the plurality of destination candidates with respect to the observed variable that is acquired by the observed variable acquiring unit, and estimates a destination candidate having a high probability to be the destination.

18. A destination estimating method, comprising:
a history storing step of storing a history of a location that has been specified as a destination in the past;
a destination estimating step of estimating a destination from among a plurality of destination candidates including a location stored in the history storing step;
a candidate excluding step of, based on the history that is stored in the history storing step, excluding a destination candidate for which a certainty factor of being a destination is determined to be lower than a predetermined threshold value from destination candidates to be estimated as being a destination in the destination estimating step;
an observed variable acquiring step of acquiring an observed variable; and
a probability acquiring step of, based on a probability model for determining a probability of the plurality of destination candidates with respect to the observed variable, determining a probability of the plurality of destination candidates with respect to the observed variable that is acquired in the observed variable acquiring step;
wherein:
the candidate excluding step excludes a destination candidate for which it is determined that the certainty factor is lower than a predetermined threshold value from the destination candidates for which a probability is determined in the probability acquiring step; and
the destination estimating step estimates a destination candidate for which a probability that is determined in the probability acquiring step is high among the destination candidates that remain after the destination candidate is excluded in the candidate excluding step to be the destination.

19. A destination estimating method, comprising:
a history storing step of storing a history of a location that has been specified as a destination in the past;
a destination estimating step of estimating a destination from among a plurality of destination candidates including a location stored in the history storing step;
a candidate excluding step of, based on the history that is stored in the history storing step, excluding a destination candidate for which a certainty factor of being a destination is determined to be lower than a predetermined threshold value from destination candidates to be estimated as being a destination in the destination estimating step;
an observed variable acquiring step of acquiring an observed variable; and
a learning step of, taking the destination in the history as the destination candidate, learning a probability model for determining a probability of the plurality of destination candidates with respect to the observed variable;
wherein:
the candidate excluding step excludes a destination candidate for which, based on the history that is stored in the history storing step, it is determined that a certainty factor of being a destination is lower than a predetermined threshold value from the destination candidates that are used for learning in the learning step; and based on the probability model that is learned by the learning step, the destination estimating step determines a probability of the plurality of destination candidates with respect to the observed variable that is acquired in the observed variable acquiring step, and estimates a destination candidate having a high probability to be the destination.

20. A non-transitory computer readable medium having a computer program product that causes a computer to execute:

a history storing step of storing a history of a location that has been specified as a destination;

a destination estimating step of estimating a destination from among a plurality of destination candidates including a location stored in the history storing step;

a candidate excluding step of, based on the history that is stored in the history storing step, excluding a destination candidate for which a certainty factor of being a destination is determined to be lower than a predetermined threshold value from destination candidates to be estimated as being a destination in the destination estimating step;

an observed variable acquiring step of acquiring an observed variable; and a probability acquiring step of, based on a probability model for determining a probability of the plurality of destination candidates with respect to the observed variable, determining a probability of the plurality of destination candidates with respect to the observed variable that is acquired in the observed variable acquiring step;

wherein:

the candidate excluding step excludes a destination candidate for which it is determined that the certainty factor is lower than a predetermined threshold value from the destination candidates for which a probability is determined in the probability acquiring step; and the destination estimating step estimates a destination candidate for which a probability that is determined in the probability acquiring step is high among the destination candidates that remain after the destination candidate is excluded in the candidate excluding step to be the destination.

21. A non-transitory computer readable medium having a computer program product that causes a computer to execute:

a history storing step of storing a history of a location that has been specified as a destination;

a destination estimating step of estimating a destination from among a plurality of destination candidates including a location stored in the history storing step;

a candidate excluding step of, based on the history that is stored in the history storing step, excluding a destination candidate for which a certainty factor of being a destination is determined to be lower than a predetermined threshold value from destination candidates to be estimated as being a destination in the destination estimating step;

an observed variable acquiring step of acquiring an observed variable; and a learning step of, taking the destination in the history as the destination candidate, learning a probability model for determining a probability of the plurality of destination candidates with respect to the observed variable;

wherein:

the candidate excluding step excludes a destination candidate for which, based on the history that is stored in the history storing step, it is determined that a certainty factor of being a destination is lower than a predetermined threshold value from the destination candidates that are used for learning in the learning step; and based on the probability model that is learned by the learning step, the destination estimating step determines a probability of the plurality of destination candidates with respect to the observed variable that is acquired in the observed variable acquiring step, and estimates a destination candidate having a high probability to be the destination.

* * * * *